(12) United States Patent
Fujikawa et al.

(10) Patent No.: US 9,556,588 B2
(45) Date of Patent: Jan. 31, 2017

(54) FLOOR MEMBER AND WORKING MACHINE

(71) Applicant: KOBELCO CONSTRUCTION MACHINERY CO., LTD., Hiroshima-shi (JP)

(72) Inventors: Koji Fujikawa, Hiroshima (JP); Keiji Yamamoto, Hiroshima (JP); Yasumitsu Fujii, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 5 days.

(21) Appl. No.: 14/606,483

(22) Filed: Jan. 27, 2015

(65) Prior Publication Data

US 2015/0233092 A1    Aug. 20, 2015

(30) Foreign Application Priority Data

Feb. 17, 2014    (JP) .................. 2014-027837

(51) Int. Cl.
*E02F 9/16* (2006.01)
*B62D 25/20* (2006.01)

(52) U.S. Cl.
CPC .................. *E02F 9/16* (2013.01); *B62D 25/20* (2013.01)

(58) Field of Classification Search
CPC .................................. B62D 25/20; E02F 9/16
(Continued)

(56) References Cited

U.S. PATENT DOCUMENTS 6,209,949 B1    4/2001  Sakyo et al.
7,246,846 B2 *  7/2007  Shioji .................... E02F 9/163
                                                180/89.12
(Continued)

FOREIGN PATENT DOCUMENTS

EP    0 921 055 A2    6/1999
EP    0 921 055 A3    6/1999
(Continued)

OTHER PUBLICATIONS

Extended European Search Report issued Jul. 17, 2015 in Patent Application No. 15153556.4.
(Continued)

*Primary Examiner* — Joseph D Pape
*Assistant Examiner* — Dana Ivey
(74) *Attorney, Agent, or Firm* — Oblon, McClelland, Maier & Neustadt, L.L.P.

(57) ABSTRACT

A floor member includes a floor plate extending in a length direction along a front-rear direction of a cab. The floor plate includes front-left corner portion, front-right corner portion, rear-left corner portion, and rear-right corner portion; a first vertical beam member; a second vertical beam member; and a plurality of support members which support the first vertical beam member, the second vertical beam member, and the floor plate in respective regions including a region where the front-left corner portion and a first front end overlap each other, a region where the rear-left corner portion and a first rear end overlap each other, a region where the front-right corner portion and a second front end overlap each other, and a region where the rear-right corner portion and a second rear end overlap each other.

3 Claims, 6 Drawing Sheets (58) Field of Classification Search
USPC .................................................. 296/190.08
See application file for complete search history.

(56) References Cited

U.S. PATENT DOCUMENTS

2001/0005092 A1    6/2001   Sakyo et al.
2010/0301634 A1   12/2010   Ansorge

FOREIGN PATENT DOCUMENTS

| EP | 2 142 421 | 1/2010 |
| JP | 2001-20320 A | 1/2001 |
| JP | 2006 56325 | 3/2006 |
| JP | 2006-56325 A | 3/2006 |
| JP | 2010-42761 A | 2/2010 |
| WO | WO 2008/135284 A1 | 11/2008 |

OTHER PUBLICATIONS

Office Action issued Nov. 24, 2015 in Japanese Patent Application No. 2014-027837 (with English language translation).

\* cited by examiner

FLOOR MEMBER AND WORKING MACHINE

BACKGROUND OF THE INVENTION

Field of the Invention

The present invention relates to a floor member including a floor portion of a cab provided in a working machine, and a working machine provided with the floor member.

Description of the Background Art

Conventionally, there is known a construction machine provided with a lower traveling body, an upper slewing body including a slewing frame slewably mounted on the lower traveling body, and a cab loaded on the slewing frame and to be operated by an operator (see e.g. Japanese Unexamined Patent Publication No. 2006-56325). In the construction machine, the cab includes a rectangular floor plate extending in a front-rear direction of the cab, a cab box loaded on the floor plate, and four mount members directly attached to the back surface of the floor plate in such a manner as to respectively overlap the four corner portions of the floor plate. The floor plate and the cab box are supported on the slewing frame of the upper slewing body via the four mount members.

The cab of the construction machine further includes a pair of left and right reinforcement members joined to the back surface of the floor plate in order to prevent vibrations by flexure of the floor plate. Each of the reinforcement members extends in the length direction along the front-rear direction of the cab, but is disposed in a region between each two mount members located on the front side and on the rear side in the length direction so as to avoid interference with the mount members attached to the corner portions of the floor plate. Specifically, each of the reinforcement members is disposed at a lengthwise middle portion of the floor plate. Each of the reinforcement members is aligned with the corresponding two mount members located on the front side and on the rear side of the floor plate in the length direction, but is distanced away from the corresponding two mount members.

In the construction machine, the floor plate has a rectangular shape extending in a front-rear direction of the cab, and the four corner portions of the floor plate are supported on the slewing frame via the mount members. In this configuration, the lengthwise middle portion of the floor plate may be flexed when a heavy load is loaded on the lengthwise middle portion of the floor plate. In order to prevent such a flexure, there is proposed an idea of increasing the thickness of the floor plate or increasing the thickness of the reinforcement members disposed at the middle portion of the floor plate. However, this may unavoidably increase the entire weight and cost of the floor plate and of the reinforcement members.

SUMMARY OF THE INVENTION

In view of the above, an object of the invention is to provide a floor member that enables to prevent flexure of a lengthwise middle portion of a floor plate, without accompanying a remarkable increase in weight and cost of a construction machine.

The invention is directed to a floor member including a floor portion of a cab provided in a working machine. The floor member includes a floor plate extending in a length direction along a front-rear direction of the cab, the floor plate including a rear-left corner portion, a rear-right corner portion, a front-left corner portion arranged with the rear-left corner portion in the length direction on a front side of the rear-left corner portion, and a front-right corner portion arranged with the rear-right corner portion in the length direction on a front side of the rear-right corner portion; a first vertical beam member including a first front end which overlaps the front-left corner portion, and a first rear end which overlaps the rear-left corner portion, the first vertical beam member being joined to the floor plate along the length direction; a second vertical beam member including a second front end which overlaps the front-right corner portion, and a second rear end which overlaps the rear-right corner portion, the second vertical beam member being joined to the floor plate along the length direction; and a plurality of support members which support the first vertical beam member, the second vertical beam member, and the floor plate in respective regions including a region where the front-left corner portion and the first front end overlap each other, a region where the rear-left corner portion and the first rear end overlap each other, a region where the front-right corner portion and the second front end overlap each other, and a region where the rear-right corner portion and the second rear end overlap each other.

These and other objects, features and advantages of the present invention will become more apparent upon reading the following detailed description along with the accompanying drawings.

DESCRIPTION OF THE PREFERRED EMBODIMENT

In the following, an embodiment of the present invention is described referring to the drawings. The following embodiment is an example embodying the invention, and does not limit the technical scope of the invention.

Further, in the drawings to be referred to in the following description, illustration of main elements necessary for describing the invention is omitted from the constituent elements of the embodiment to simplify the description. In view of the above, a floor member and a working machine of the invention may include optional elements, which are not illustrated in the drawings to be referred to in the present specification.

Figure 1:
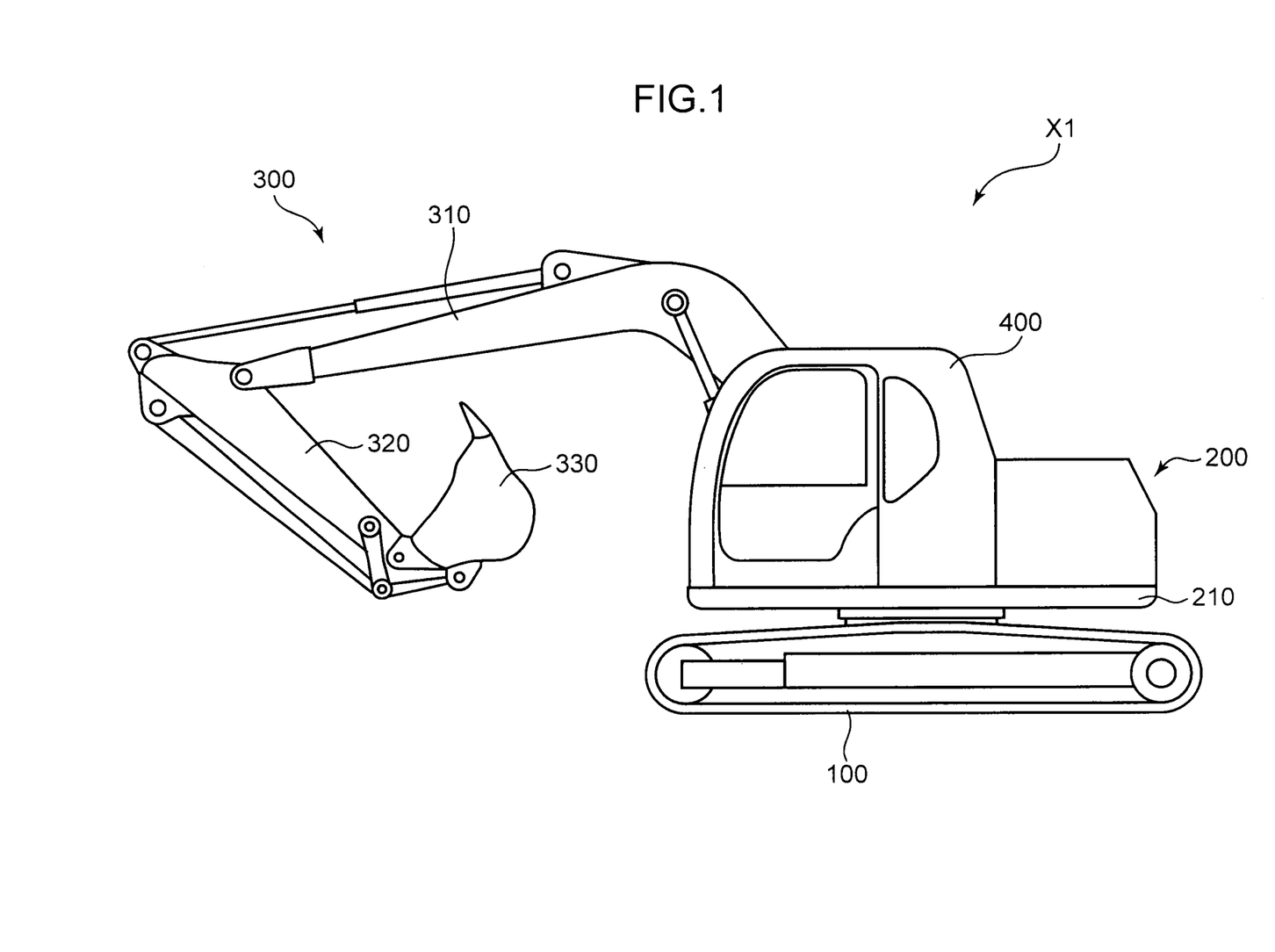
FIG. 1 is a schematic side view illustrating a construction machine embodying the invention.

A construction machine X1 of the embodiment corresponds to a working machine of the invention. As illustrated in FIG. 1, the construction machine X1 is provided with a lower traveling body 100, an upper slewing body 200, an attachment 300, and a cab 400.

The lower traveling body 100 is provided with a pair of left and right crawlers to travel on the ground.

Figure 2:
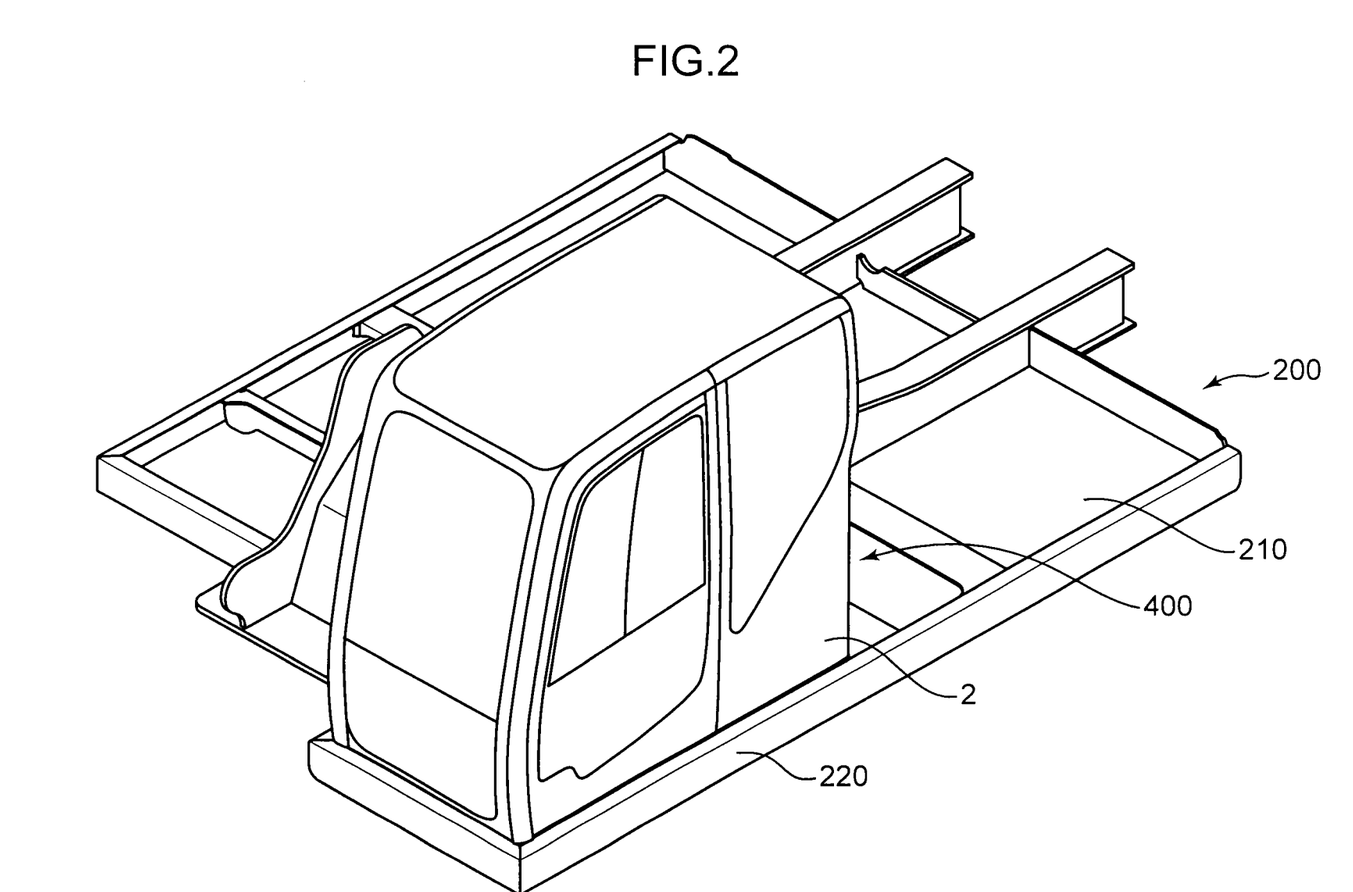
FIG. 2 is a schematic perspective view illustrating a cab and a slewing frame in the embodiment.
Figure 3:
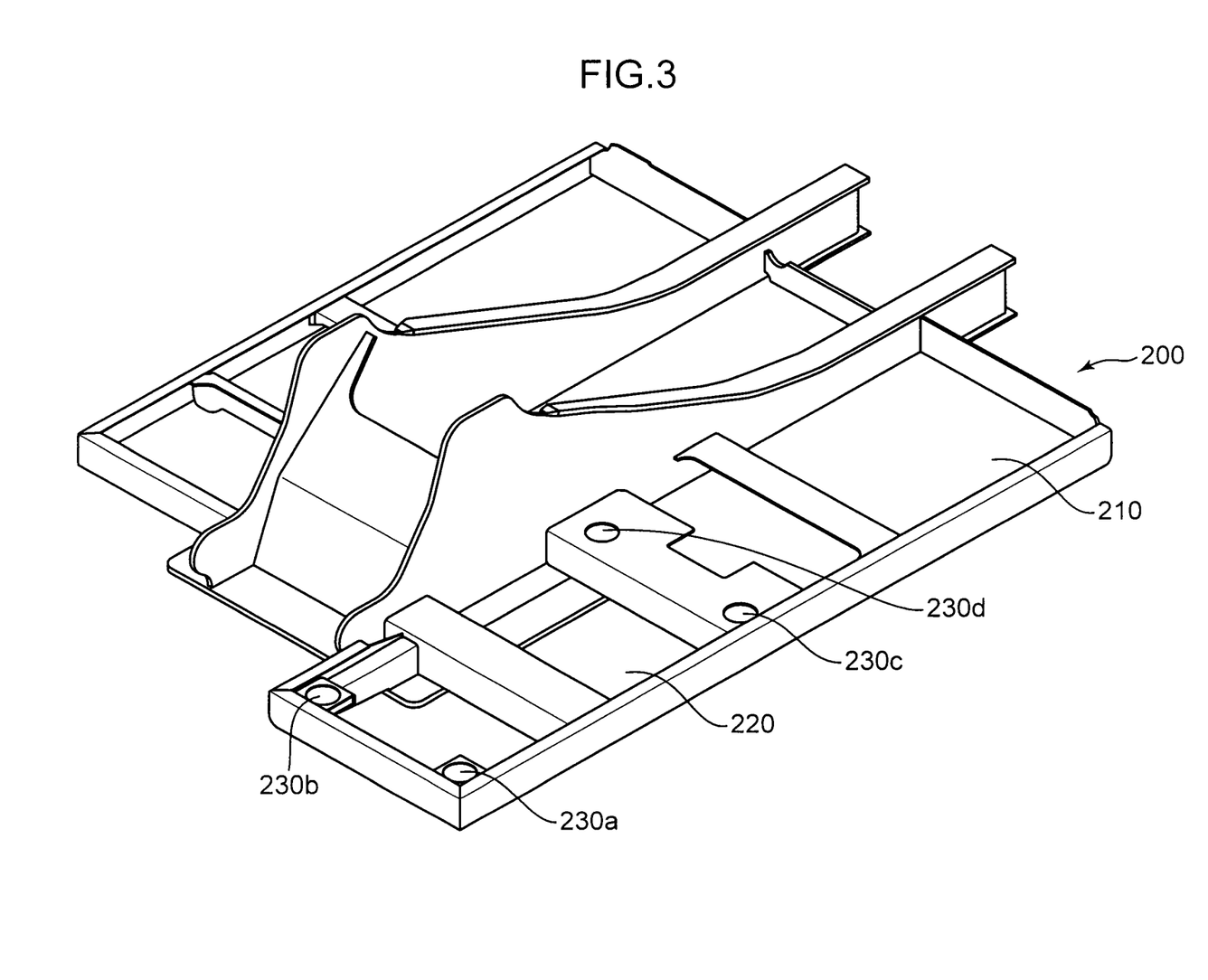
FIG. 3 is a schematic perspective view illustrating the slewing frame in the embodiment.

The upper slewing body 200 is loaded on the lower traveling body 100 to be slewable around an axis extending in a direction perpendicular to the ground on which the lower traveling body 100 travels. As illustrated in FIG. 2 and FIG. 3, the upper slewing body 200 includes a slewing frame 210. The slewing frame 210 is disposed above the lower traveling body 100, and is slewably connected to the lower traveling body 100.

The attachment 300 is a member for excavation or the like. The attachment 300 is loaded on the upper slewing body 200. In the embodiment, the attachment 300 includes a boom 310 mounted on the slewing frame 210 to be raised and lowered, an arm 320 pivotally mounted at a tip end of the boom 310, and a bucket 330 pivotally mounted at a tip end of the arm 320.

The cab 400 includes an operation chamber in which the operator of the construction machine X1 operates the construction machine X1. The cab 400 is disposed laterally on the attachment 300. The cab 400 is formed on the upper slewing body 200. The slewing frame 210 of the upper slewing body 200 includes a cab loading portion 220. The cab loading portion 220 is disposed on the front side of the slewing frame 210 in front-rear direction of the slewing frame 210. The cab 400 is loaded on the cab loading portion 220.

Figure 4:
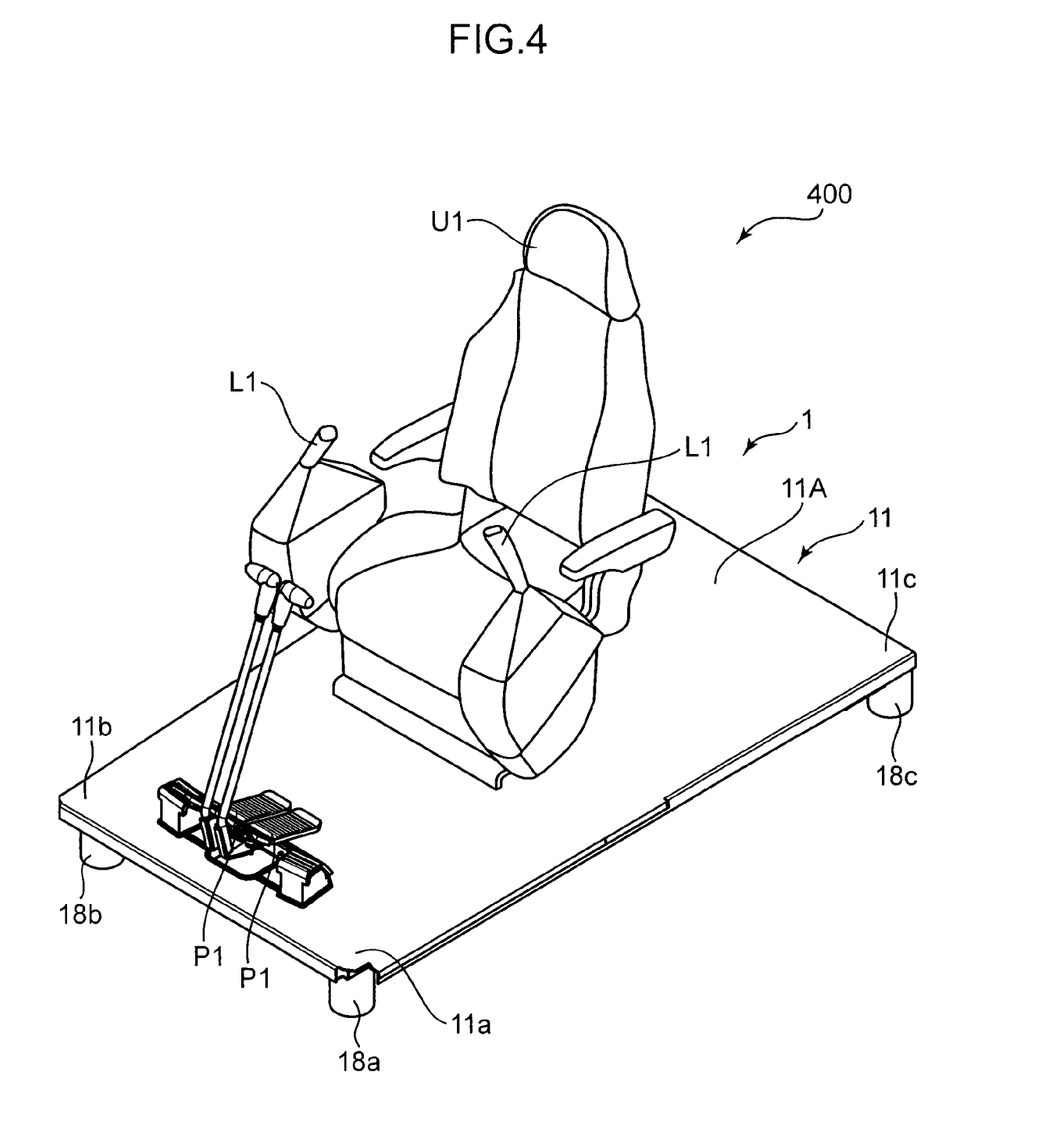
FIG. 4 is a schematic perspective view illustrating the cab in the embodiment, and is a diagram in which a cab frame body is omitted.

As illustrated in FIG. 2 and FIG. 4, the cab 400 is provided with a floor member 1 and a cab frame body 2. The floor member 1 includes a floor portion of the cab 400. The cab frame body 2 is provided on the floor member 1. The cab frame body 2 and the floor member 1 surround the operation chamber, which is the inner space of the cab 400. As illustrated in FIG. 4, a driver's seat U1 on which the operator of the construction machine X1 is seated, operation levers L1 for use in operating the attachment 300, and traveling pedals P1 for use in operating the lower traveling body 100 are disposed in the operation chamber of the cab 400. The operator of the construction machine X1 is allowed to perform various kinds of operations of the construction machine X1 in the operation chamber.

Figure 5:
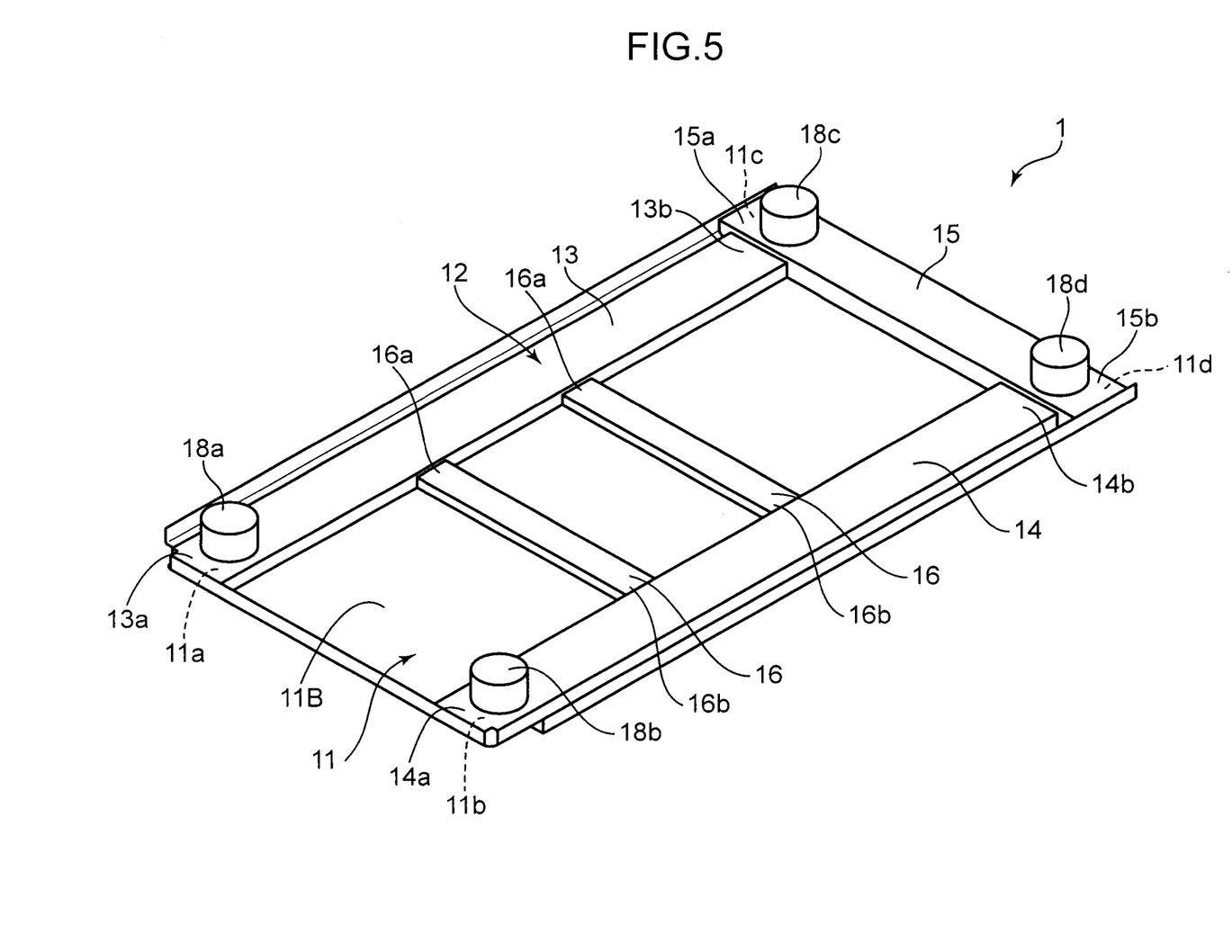
FIG. 5 is a schematic perspective view illustrating a floor member in the embodiment, and is a diagram as viewed from the back surface of a floor plate.

As illustrated in FIG. 4 and FIG. 5, the floor member 1 is provided with a floor plate 11, a vertical beam unit 12, a reinforcement member 15, two lateral beam members 16, and four support members 18a to 18d.

The floor plate 11 is a plate member including a top surface 11A, and a back surface 11B on the opposite side of the top surface 11A. The top surface 11A of the floor plate 11 is a surface on which the operator of the construction machine X1 steps for operating the construction machine X1. The top surface 11A faces the operation chamber inside the cab 400. The back surface 11B of the floor plate 11 is a surface facing the cab loading portion 220 of the slewing frame 210. The floor plate 11 extends in a front-rear direction of the cab 400. In the embodiment, the floor plate 11 has a rectangular shape including a long side extending in the front-rear direction of the cab 400, and a short side extending in left and right directions of the cab 400. Thus, the front-rear direction of the cab 400 coincide with the length direction of the floor plate 11, and left and right directions of the cab 400 coincide with the width direction of the floor plate 11.

The floor plate 11 has four corner portions 11a to 11d. Specifically, the floor plate 11 includes the rear-left corner portion 11c, the rear-right corner portion 11d, the front-left corner portion 11a arranged with the rear-left corner portion 11c in the length direction of the floor plate 11, and the front-right corner portion 11b arranged with the rear-right corner portion 11d in the length direction of the floor plate 11. The front-left corner portion 11a located on a front side of the rear-left corner portion 11c in the length direction of the floor plate 11. The front-right corner portion 11b located on a front side of the rear-right corner portion 11d in the length direction of the floor plate 11. The floor plate 11 is not necessarily a rectangular shape. The floor plate 11 may have such a shape that one of the sides of the floor plate 11 is not straight. Further, the floor plate 11 may have such a shape that an irregular projection or recess is formed at a lengthwise intermediate portion of the floor plate 11 or at a widthwise intermediate portion of the floor plate 11. In other words, the floor plate 11 may have any shape, as long as the length of the floor plate 11 in the front-rear direction of the cab 400 is larger than the width of the floor plate 11 in left and right directions of the cab 400, and that the four corner portions 11a and 11d are provided.

The vertical beam unit 12 is a member for enhancing flexural rigidity of the floor plate 11 in the length direction thereof. The vertical beam unit 12 extends in the length direction of the floor plate 11. The vertical beam unit 12 is joined to the back surface 11B of the floor plate 11. The expression "the vertical beam unit 12 is joined to the back surface 11B of the floor plate 11" not only includes a configuration such that the vertical beam unit 12 is directly adhered to the back surface 11B of the floor plate 11, but also includes a configuration such that the vertical beam unit 12 is fixed in contact with the back surface 11B of the floor plate 11 by support members 18a and 18b to be described later. In the embodiment, the vertical beam unit 12 is joined to the back surface 11B of the floor plate 11. Alternatively, the vertical beam unit 12 may be joined to the top surface 11A of the floor plate 11.

The vertical beam unit 12 includes a first vertical beam piece 13 and a second vertical beam piece 14.

The first vertical beam piece 13 is disposed on the left side of the floor plate 11 in the width direction thereof. The first vertical beam piece 13 includes a front end 13a located on the front side of the floor plate 11 in the length direction thereof, and a rear end 13b located on the rear side of the floor plate 11 in the length direction thereof. The front end 13a of the first vertical beam piece 13 overlaps the front-left corner portion 11a of the floor plate 11. The rear end 13b of the first vertical beam piece 13 is located on the front side with respect to the rear-left corner portion 11c of the floor plate 11 in the length direction thereof.

The second vertical beam piece 14 is disposed on the right side of the floor plate 11 in the width direction thereof. The second vertical beam piece 14 includes a front end 14a located on the front side of the floor plate 11 in the length direction thereof, and a rear end 14b located on the rear side of the floor plate 11 in the length direction thereof. The front end 14a of the second vertical beam piece 14 overlaps the front-right corner portion 11b of the floor plate 11. The rear end 14b of the second vertical beam piece 14 is located on the front side with respect to the rear-right corner portion 11d of the floor plate 11 in the length direction thereof.

The reinforcement member 15 is a member for reinforcing the rear end of the floor plate 11 in the length direction thereof. The reinforcement member 15 extends in the width direction of the floor plate 11. The reinforcement member 15 is joined to the back surface 11B of the floor plate 11. The expression "the reinforcement member 15 is joined to the back surface 11B of the floor plate 11" not only includes a configuration such that the reinforcement member 15 is directly adhered to the back surface 11B of the floor plate 11, but also includes a configuration such that the reinforcement member 15 is fixed in contact with the back surface 11B of the floor plate 11 by support members 18c and 18d to be described later. In the embodiment, the reinforcement member 15 is joined to the back surface 11B of the floor plate 11. Alternatively, when the vertical beam unit 12 is joined to the top surface 11A of the floor plate 11, the reinforcement member 15 may be joined to the top surface 11A of the floor plate 11, as well as the vertical beam unit 12.

The reinforcement member 15 includes a first end 15a located on the left side of the floor plate 11 in the width direction thereof, and a second end 15b located on the right side of the floor plate 11 in the width direction thereof. The first end 15a of the reinforcement member 15 overlaps the rear-left corner portion 11c of the floor plate 11. The second end 15b of the reinforcement member 15 overlaps the rear-right corner portion 11d of the floor plate 11. Specifically, the reinforcement member 15 extends from the rear-left corner portion 11c to the rear-right corner portion 11d of the floor plate 11 in the width direction of the floor plate 11.

In the embodiment, the first vertical beam piece 13 and the first end 15a correspond to a first vertical beam member of the invention. The rear end 13b of the first vertical beam piece 13 and the first end 15a of the reinforcement member 15 are joined together by welding in the length direction of the floor plate 11. A joined member constituted of the first vertical beam piece 13 and the first end 15a includes the front end 13a that overlaps the front-left corner portion 11a, and the first end 15a that overlaps the rear-left corner portion 11c. The joined member is joined to the floor plate 11 along the length direction of the floor plate 11. In the embodiment, the front end 13a of the first vertical beam piece 13 corresponds to a first front end of the first vertical beam member of the invention, and the first front end 15a of the reinforcement member 15 corresponds to a first rear end of the first vertical beam member of the invention.

Further, in the embodiment, the second vertical beam piece 14 and the second end 15b correspond to a second vertical beam member of the invention. The rear end 14b of the second vertical beam piece 14 and the second end 15b of the reinforcement member 15 are joined together by welding in the length direction of the floor plate 11. A joined member constituted of the second vertical beam piece 14 and the second end 15b includes the front end 14a that overlaps the front-right corner portion 11b, and the second end 15b that overlaps the rear-right corner portion 11d. The joined member is joined to the floor plate 11 along the length direction of the floor plate 11. In the embodiment, the front end 14a of the second vertical beam piece 14 corresponds to a second front end of the second vertical beam member of the invention, and the second end 15b of the reinforcement member 15 corresponds to a second rear end of the second vertical beam member of the invention.

Each of the lateral beam members 16 is a member for enhancing flexural rigidity of the floor plate 11 in the width direction thereof. Each of the lateral beam members 16 in the embodiment extends in the width direction of the floor plate 11. Further, each of the lateral beam members 16 is joined to the back surface 11B of the floor plate 11 along the width direction thereof. Each of the lateral beam members 16 is provided at a lengthwise intermediate portion of the floor plate 11, and is located below the driver's seat U1. Each of the lateral beam members 16 includes a left end 16a located on the side of the first vertical beam piece 13, and a right end 16b located on the side of the second vertical beam piece 14 in the width direction of the floor plate 11. The left end 16a of each of the lateral beam members 16 is welded to the first vertical beam piece 13, and fixed to the first vertical beam piece 13. The right end 16b of each of the lateral beam members 16 is welded to the second vertical beam piece 14, and fixed to the second vertical beam piece 14.

The number and the positions of the lateral beam members 16 may be changed. It is possible to change the number and the positions of the lateral beam members 16 as necessary according to the position of a heavy load to be loaded on the top surface 11A of the floor plate 11. In the embodiment, each of the lateral beam members 16 is joined to the back surface 11B of the floor plate 11. The invention is not limited to the above. When the vertical beam unit 12 is joined to the top surface 11A of the floor plate 11, the lateral beam members 16 may be joined to the top surface 11A of the floor plate 11 as well as the vertical beam unit 12.

The support members 18a to 18d support the floor plate 11, the vertical beam unit 12, and the reinforcement member 15 in respective regions including a region where the front-left corner portion 11a and the front end 13a of the first vertical beam piece 13 overlap each other, a region where the front-right corner portion 11b and the front end 14a of the second vertical beam piece 14 overlap each other, a region where the rear-left corner portion 11c and the first end 15a of the reinforcement member 15 overlap each other, and a region where the rear-right corner portion 11d and the second end 15b of the reinforcement member 15 overlap each other. In the embodiment, the support members 18a to 18d are respectively mounted on the front end 13a of the first vertical beam piece 13, the front end 14a of the second vertical beam piece 14, the first end 15a of the reinforcement member 15, and the second end 15b of the reinforcement member 15 in correspondence to the corner portions 11a to 11d of the floor plate 11. According to this configuration, a joined member constituted of the first vertical beam piece 13 and the first end 15a of the reinforcement member 15, which corresponds to the first vertical beam member of the invention, is supported on the support members 18a and 18c on the front side and on the rear side of the floor plate 11 in the length direction thereof. Further, a joined member constituted of the second vertical beam piece 14 and the second end 15b of the reinforcement member 15, which corresponds to the second vertical beam member of the invention, is supported on the support members 18b and 18d on the front side and on the rear side of the floor plate 11 in the length direction thereof. Further, the floor plate 11 is supported on the support members 18a to 18d via the vertical beam unit 12 and the reinforcement member 15.

In the embodiment, the vertical beam unit 12 and the reinforcement member 15 are interposed between the support members 18a to 18d, and the back surface 11B of the floor plate 11. Alternatively, the vertical beam unit 12 and the reinforcement member 15 may not be interposed between the support members 18a to 18d, and the back surface 11B of the floor plate 11. When the vertical beam unit 12 and the reinforcement member 15 are joined to the top surface 11A of the floor plate 11, the support members 18a to 18d are mounted on the back surface 11B of the floor plate 11 in respective regions including a region where the front-left corner portion 11a and the front end 13a of the first vertical beam piece 13 overlap each other, a region where the front-right corner portion 11b and the front end 14a of the second vertical beam piece 14 overlap each other, a region where the rear-left corner portion 11c and the first end 15a of the reinforcement member 15 overlap each other, and a region where the rear-right corner portion 11d and the second end 15b of the reinforcement member 15 overlap each other.

Four retaining holes 230a to 230d are formed in the cab loading portion 220 of the slewing frame 210 at positions corresponding to the positions of the support members 18a to 18d on the floor member 1. The support members 18a to 18d are received in the retaining holes 230a to 230d formed in the cab loading portion 220. According to this configuration, the support members 18a to 18d provided on the cab loading portion 220 of the slewing frame 210 support the cab frame body 2 via the floor plate 11, the vertical beam unit 12, and the reinforcement member 15 in respective regions including a region where the front-left corner portion 11a and the front end 13a of the first vertical beam piece 13 overlap each other, a region where the front-right corner portion 11b and the front end 14a of the second vertical beam piece 14 overlap each other, a region where the rear-left corner portion 11c and the first end 15a of the reinforcement member 15 overlap each other, and a region where the rear-right corner portion 11d and the second end 15b of the reinforcement member 15 overlap each other.

As described above, in the floor member 1 of the construction machine X1, a joined member constituted of the first vertical beam piece 13 and the first end 15a, which corresponds to the first vertical beam member of the invention, extends from the front-left corner portion 11a to the rear-left corner portion 11c of the floor plate 11. Likewise, a joined member constituted of the second vertical beam piece 14 and the second end 15b, which corresponds to the second vertical beam member of the invention, extends from the front-right corner portion 11b to the rear-right corner portion 11d of the floor plate 11. This is advantageous in increasing the length of each of the joined members corresponding to the first and second vertical beam members, as compared with a configuration, in which the first and second vertical beam members are provided in such a manner as to avoid interference with the support members 18a to 18d in the regions between the support members 18a and 18c, and between the support members 18b and 18d.

Further, the support members 18a to 18d on the floor member 1 support the joined members and the floor plate 11 in the regions where both ends of each of the joined members overlap the corner portions 11a to 11d of the floor plate 11. Thus, the support members 18a to 18d can support not only the floor plate 11 but also the first and second vertical beam members.

As described above, the floor member 1 of the construction machine X1 can enhance flexural rigidity of the floor plate 11 in the length direction thereof. This is advantageous in preventing flexure of a widthwise middle portion of the floor plate 11, without excessively increasing the thickness of the floor plate 11, and the thickness of the joined members corresponding to the first and second vertical beam members.

Further, in the floor member 1, the joined members are joined to the back surface 11B of the floor plate 11 and interposed between the floor plate 11 and the support members 18a to 18d. According to this configuration, the vertical beam unit 12 and the reinforcement member 15 are not present on the top surface 11A of the floor plate 11 in the operation chamber inside the cab 400. This is advantageous in avoiding narrowing the operation chamber due to the existence of the vertical beam unit 12 and the reinforcement member 15.

Further, the floor member 1 includes the lateral beam members 16 each extending in the width direction of the floor plate 11. The left end 16a of each of the lateral beam members 16 is fixed to the first vertical beam piece 13, and the right end 16b of each of the lateral beam members 16 is fixed to the second vertical beam piece 14. This is advantageous in preventing flexure of the widthwise middle portion of the floor plate 11. For instance, when the driver's seat U1 is disposed at the widthwise middle portion of the floor plate 11, the widthwise middle portion of the floor plate 11 may be flexed due to the weight of the driver's seat U1. In the floor member 1, the lateral beam members 16 each extending in the width direction of the floor plate 11 are joined to the back surface 11B of the floor plate 11. Therefore, it is possible to prevent flexure of the widthwise middle portion of the floor plate 11. Further, the left end 16a and the right end 16b of each of the lateral beam members 16 are fixed to the vertical beam unit 12. Therefore, it is possible to prevent deformation or inclination of the left end 16a and the right end 16b of each of the lateral beam members 16 toward the widthwise middle portion of the floor plate 11 due to flexure of the widthwise middle portion of the floor plate 11. This is advantageous in preventing flexure of the widthwise middle portion of the floor plate 11.

In the floor member 1, the reinforcement member 15 extends from the rear-left corner portion 11c to the rear-right corner portion 11d of the floor plate 11. This is advantageous in enhancing rigidity of the rear end of the floor plate 11 in the length direction thereof, where a heavy load is likely to be loaded. Thus, it is possible to prevent flexure of the rear end of the floor plate 11 due to the heavy load.

In the embodiment, the first vertical beam piece 13 and the first end 15a of the reinforcement member 15 correspond to the first vertical beam member of the invention, and the second vertical beam piece 14 and the second end 15b of the reinforcement member 15 correspond to the second vertical beam member of the invention. The invention is not limited to the above configuration. Each of the first vertical beam member and the second vertical beam member may be constituted of a single member.

Figure 6:
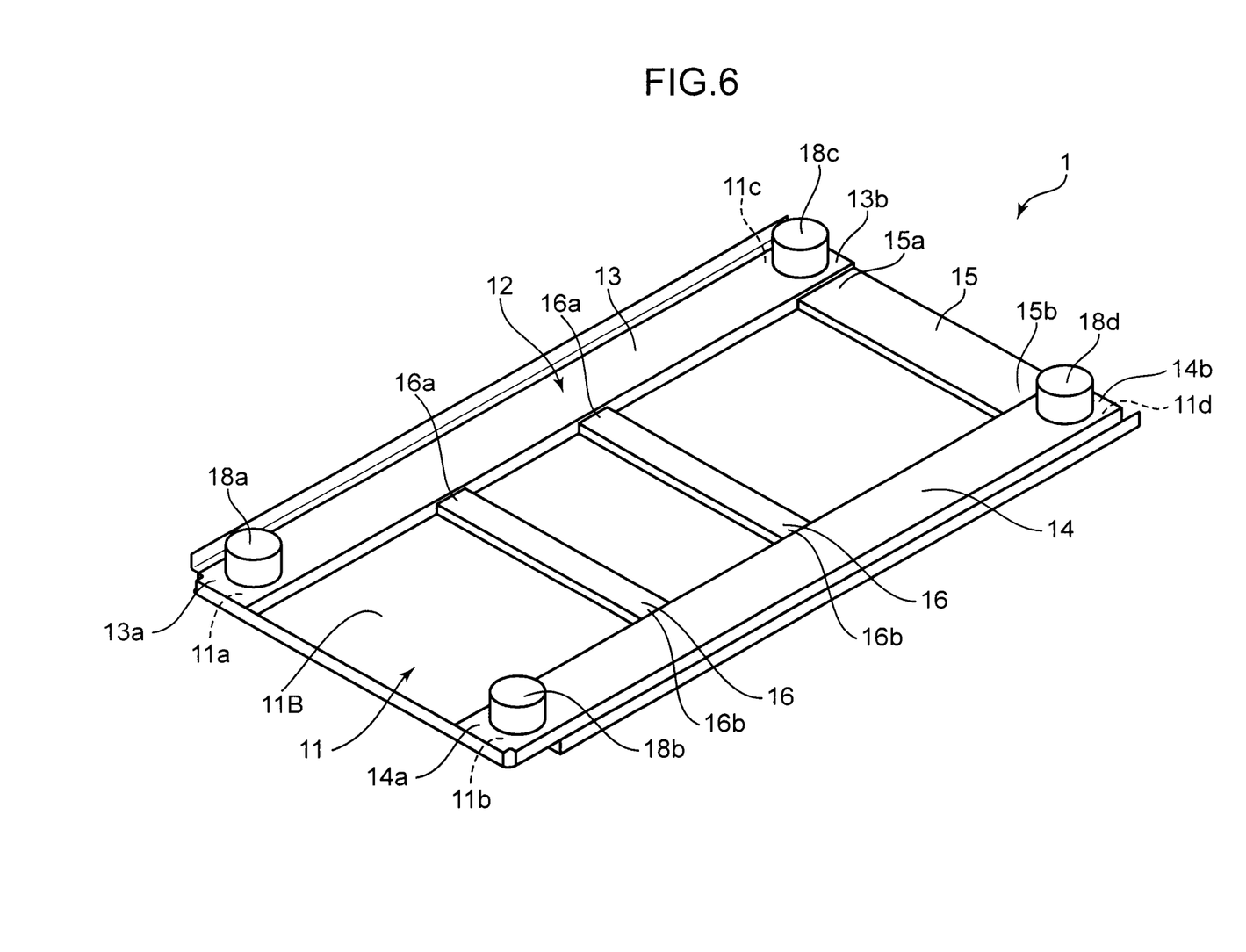
FIG. 6 is a diagram illustrating another example of the floor member in the embodiment, and is a diagram illustrating the same portion as illustrated in FIG. 5.

In the example illustrated in FIG. 6, the first vertical beam member of the invention is constituted of a first vertical beam piece 13, and the second vertical beam member of the invention is constituted of a second vertical beam piece 14.

In the example illustrated in FIG. 6, the first vertical beam piece 13 extends from a front-left corner portion 11a to a rear-left corner portion 11c in the length direction of a floor plate 11. A front end 13a of the first vertical beam piece 13 overlaps the front-left corner portion 11a of the floor plate 11. A rear end 13b of the first vertical beam piece 13 overlaps the rear-left corner portion 11c of the floor plate 11. Support members 18a and 18c support the first vertical beam piece 13 and the floor plate 11 in respective regions including a region where the front-left corner portion 11a and the front end 13a of the first vertical beam piece 13 overlap each other, and in a region where the rear-left corner portion 11c and the rear end 13b of the first vertical beam piece 13 overlap each other. Specifically, in the example illustrated in FIG. 6, the front end 13a of the first vertical beam piece 13 corresponds to the first front end of the first vertical beam member of the invention, and the rear end 13b of the first vertical beam piece 13 corresponds to the first rear end of the first vertical beam member of the invention.

Further, in the example illustrated in FIG. 6, the second vertical beam piece 14 extends from a front-right corner portion 11b to a rear-right corner portion 11d in the length direction of the floor plate 11. A front end 14a of the second vertical beam piece 14 overlaps the front-right corner portion 11d of the floor plate 11. A rear end 14b of the second vertical beam piece 14 overlaps the rear-right corner portion 11d of the floor plate 11. Support members 18b and 18d support the second vertical beam piece 14 and the floor plate 11 in respective regions including a region where the front-right corner portion 11b and the front end 14a of the second vertical beam piece 14 overlap each other, and in a region where the rear-right corner portion 11d and the rear end 14b of the second vertical beam piece 14 overlap each other. Specifically, in the example illustrated in FIG. 6, the front end 14a of the second vertical beam piece 14 corresponds to the second front end of the second vertical beam member of the invention, and the rear end 14b of the second vertical beam piece 14 corresponds to the second rear end of the second vertical beam member of the invention.

The aforementioned embodiment includes the following features of the invention.

Specifically, a floor member of the invention is a floor member including a floor portion of a cab provided in a working machine. The floor member includes a floor plate extending in a length direction along a front-rear direction of the cab, the floor plate including a rear-left corner portion, a rear-right corner portion, a front-left corner portion arranged with the rear-left corner portion in the length direction on a front side of the rear-left corner portion, and a front-right corner portion arranged with the rear-right corner portion in the length direction on a front side of the rear-right corner portion; a first vertical beam member including a first front end which overlaps the front-left corner portion and a first rear end which overlaps the rear-left corner portion, the first vertical beam member being joined to the floor plate along the length direction; a second vertical beam member including a second front end which overlaps the front-right corner portion and a second rear end which overlaps the rear-right corner portion, the second vertical beam member being joined to the floor plate along the length direction; and a plurality of support members which support the first vertical beam member, the second vertical beam member, and the floor plate in respective regions including a region where the front-left corner portion and the first front end overlap each other, a region where the rear-left corner portion and the first rear end overlap each other, a region where the front-right corner portion and the second front end overlap each other, and a region where the rear-right corner portion and the second rear end overlap each other.

In the floor member having the above configuration, the support members support the floor plate, and the first and second vertical beam members in the respective regions where both ends of each of the first and second vertical beam members, and the corner portions of the floor plate overlap each other. This is advantageous in preventing flexure of the lengthwise middle portion of the floor plate, without excessively increasing the thickness of the floor plate and of the first and second vertical beam members. In the floor member, the support members are respectively provided in the regions where the front-left corner portion and the rear-left corner portion overlap both ends of the first vertical beam member, and in the regions where the front-right corner portion and the rear-right corner portion overlap both ends of the second vertical beam member. This allows the support members to support both ends of the first and second vertical beam members, in addition to the floor plate. This is advantageous in enhancing flexural rigidity of the floor plate in the length direction, as compared with a configuration, in which support members are directly attached to the corner portions of a floor plate, and first and second vertical beam members are provided only in a region between each two support members located on the front side and the rear side of the floor plate in the length direction. Thus, the floor plate is allowed to be effectively refrained from flexure, without excessively increase in the thickness of the floor plate and of the first and second vertical beam members.

Preferably, the floor plate may include a top surface facing an inside of the cab, and a back surface on a side opposite to the top surface, and the first vertical beam member and the second vertical beam member may be joined to the back surface of the floor plate, and interposed between the floor plate and the support members.

In the floor member having the above configuration, the first and second vertical beam members joined to the back surface of the floor plate are prevented from being located on the top surface of floor member facing the inside of the cab. Thus the space inside the cab is prevented from being decreased due to the location of the first and second vertical beam members on the top surface.

Preferably, the floor member may further include a lateral beam member being joined to the floor plate along a width direction orthogonal to the length direction, the lateral beam member including a left end fixed to the first vertical beam member and a right end fixed to the second vertical beam member.

In the floor member having the above configuration, the lateral beam member is joined to the floor plate along the width direction of the floor plate. The left end and the right end of the lateral beam member are respectively fixed to the first vertical beam member and to the second vertical beam member. This makes it possible to prevent deformation or inclination of the left end and the right end of the lateral beam member toward the widthwise middle portion of the floor plate, when a heavy load is loaded on the floor plate, to thereby enhance flexural rigidity of the floor plate in the width direction thereof.

Further, a working machine of the invention includes a lower traveling body; a slewing frame slewably mounted on the lower traveling body; and a cab including the floor member having any one of the above configurations, and a cab frame body provided on the floor member, the cab being disposed on the slewing frame, wherein each of the support members of the floor member is provided on the slewing frame, the support members supporting the cab frame body, via the first vertical beam member, the second vertical beam member, and the floor plate, in respective regions which are a region where the front-left corner portion and the first front end overlap each other, a region where the rear-left corner portion and the first rear end overlap each other, a region where the front-right corner portion and the second front end overlap each other, and a region where the rear-right corner portion and the second rear end overlap each other.

In the working machine as described above, the cab including the inventive floor member is disposed on the slewing frame. The support members support the cab frame body, via the first and second vertical beam members, and the floor plate in the respective regions where both ends of each of the first and second vertical beam members overlap the corner portions of the floor plate on the slewing frame. This makes it possible to prevent flexure of the lengthwise middle portion of the floor plate, even when a heavy load such as a driver's seat or a heater is loaded on the lengthwise middle portion of the floor plate facing the inside of the cab.

This application is based on Japanese Patent Application No. 2014-027837 filed on Feb. 17, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A floor member including a floor portion of a cab provided in a working machine, comprising:
    a floor plate extending in a length direction along a front-rear direction of the cab, the floor plate including a rear-left corner portion, a rear-right corner portion, a front-left corner portion arranged with the rear-left corner portion in the length direction on a front side of the rear-left corner portion, and a front-right corner portion arranged with the rear-right corner portion in the length direction on a front side of the rear-right corner portion, and further including a top surface facing an inside of the cab and a back surface on a side opposite to the top surface;
    a first vertical beam member including a first front end which overlaps the front-left corner portion and a first rear end which overlaps the rear-left corner portion, the first vertical beam member being joined to the floor plate along the length direction;
    a second vertical beam member including a second front end which overlaps the front-right corner portion and a second rear end which overlaps the rear-right corner portion, the second vertical beam member being joined to the floor plate along the length direction; and
    a plurality of support members which are respectively provided in a plurality of regions including a first region where the front-left corner portion and the first front end overlap each other, a second region where the rear-left corner portion and the first rear end overlap each other, a third region where the front-right corner portion and the second front end overlap each other, and a fourth region where the rear-right corner portion and the second rear end overlap each other, the plurality of support members supporting the first vertical beam member, the second vertical beam member, and the floor plate,
    wherein the first vertical beam member and the second vertical beam member are interposed between the floor plate and the support members in such a manner as to overlap the floor plate and the support members in a thickness direction of the floor plate, the first vertical beam member being joined to the back surface in the thickness direction of the floor plate in such a manner as to be in contact with the back surface over the front-left corner portion to the rear-left corner portion, and the second vertical beam member being joined to the back surface in the thickness direction of the floor plate in such a manner as to be in contact with the back surface over the front-right corner portion to the rear-right corner portion.

2. The floor member according to claim 1, further comprising a lateral beam member being joined to the floor plate along a width direction orthogonal to the length direction, the lateral beam member including a left end fixed to the first vertical beam member and a right end fixed to the second vertical beam member.

3. A working machine, comprising:
    a lower traveling body;
    a slewing frame slewably mounted on the lower traveling body; and
    a cab including the floor member of claim 1, and a cab frame body provided on the floor member, the cab being disposed on the slewing frame, wherein
    each of the support members of the floor member is provided on the slewing frame, the support members supporting the cab frame body, via the first vertical beam member, the second vertical beam member, and the floor plate, in respective regions including a region where the front-left corner portion and the first front end overlap each other, a region where the rear-left corner portion and the first rear end overlap each other, a region where the front-right corner portion and the second front end overlap each other, and a region where the rear-right corner portion and the second rear end overlap each other.

* * * * *